June 24, 1930. A. L. MILLER 1,765,991
METHOD OF AND APPARATUS FOR MAKING INK, ETC
Filed Feb. 28, 1927 6 Sheets-Sheet 4

INVENTOR:
Amos L. Miller,
BY
His ATTORNEY

Fig. 9

Patented June 24, 1930

1,765,991

UNITED STATES PATENT OFFICE

AMOS L. MILLER, OF PHILADELPHIA, PENNSYLVANIA, ASSIGNOR TO THE AULT & WIBORG CO., OF CINCINNATI, OHIO, A CORPORATION OF OHIO

METHOD OF AND APPARATUS FOR MAKING INK, ETC.

Application filed February 28, 1927. Serial No. 171,523.

This invention relates to the production of inks, especially carboniferous printing inks and also, as an intermediate product, finely divided carbon or soot, this application being a continuation in part of my copending applications, Ser. No. 600,248, filed Nov. 11, 1922, for process and apparatus for producing carbon black; Ser. No. 26,913, filed Aug. 30, 1925, for method and apparatus for dealing with particles in gaseous suspension; Ser. No. 26,914, filed April 30, 1925, for manufacture of lamp black and ink and Ser. No. 719,506, filed June 12, 1924, for manufacture of lamp black as to common subject matter therein described.

The particular objects of the invention are the efficient, economical and expeditious production of carboniferous inks of high quality and also the efficient production from hydrocarbon oils and gases, of a finely divided carbon product or soot suitable for the manufacture of such inks and for various other purposes requiring a high grade carbon product in a finely divided condition and which soot is of good tinctorial strength, is in a highly flocculent condition and of a high degree of purity.

Further objects of the invention are the provision of an efficient apparatus suitable for the production of such inks and soot, which apparatus is highly efficient, easily controlled and relatively inexpensive to construct.

In the accompanying drawings, in which I have illustrated a preferred form of apparatus suitable for carrying out one form of my invention.

Referring to the drawings and the construction shown therein, the reference numeral 1 designates the shell proper of the furnace and 2 a water jacket which is adapted to cool the upper unprotected portions of the shell of such furnace whereas a refractory lining composed of suitable firebricks 3 serves for protecting the hearth as well as the shell at the front and $d$ the furnace, as indicated, from the intense heat of the products of combustion within the furnace. As shown, the top of the furnace, as well as the upper front wall of the shell, are protected solely by the water jacket.

At the front of the furnace I provide a cylindrical extension 4, in which is positioned a pipe section 5, also of suitable refractory material, the same being so disposed as to provide vertical air passages $b$ and $c$, and an annular air passage $d$, all in communication with a central or main duct $e$, as indicated.

Manholes 6, and 6' afford access to the burner of the furnace for the introduction of oil soaked waste or other combustibles used for igniting purposes, or for the cleaning of the burner or other purposes. The said extension 4 has an apertured rear wall 7 to which is secured a supplemental cylindrical extension 8 that encloses the burner nozzle and the casing 8 is provided at its lower end with an air port 9.

Figure 1:
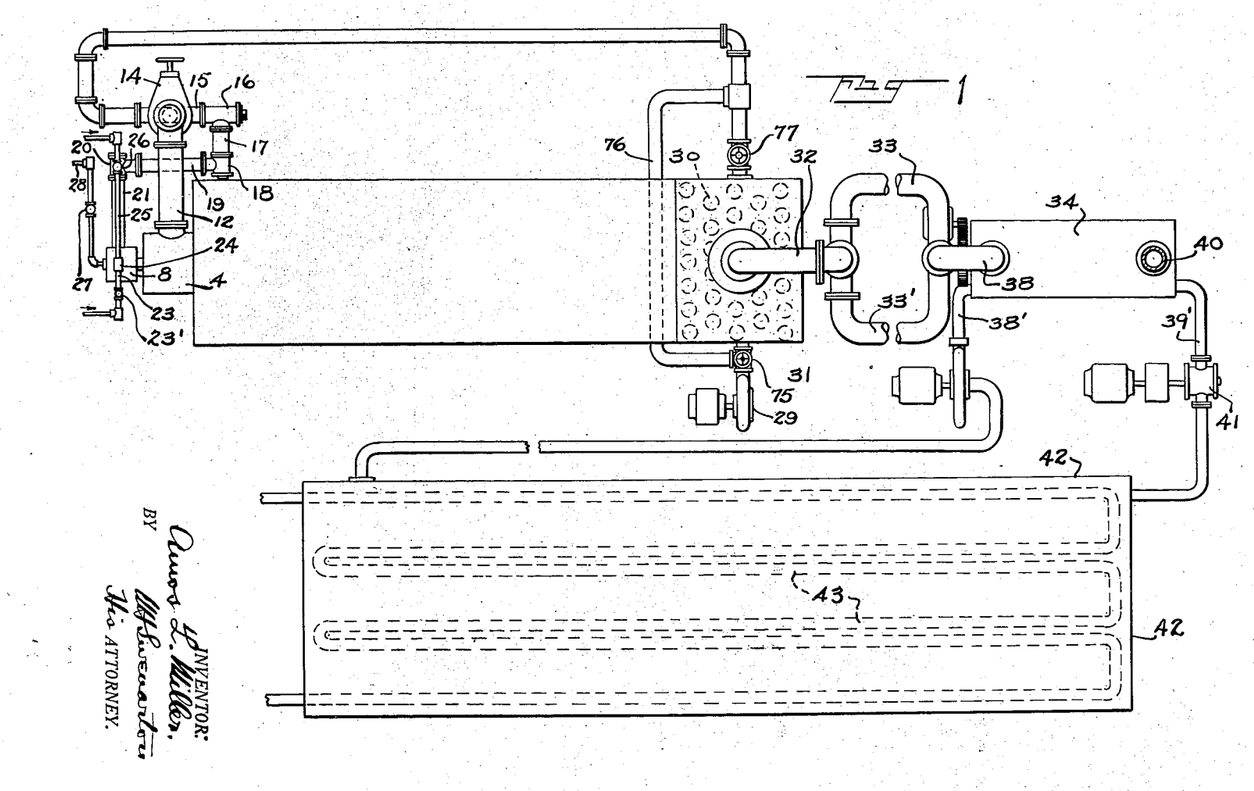
Figure 1 is a diagrammatic plan view of such apparatus.
Figure 2:
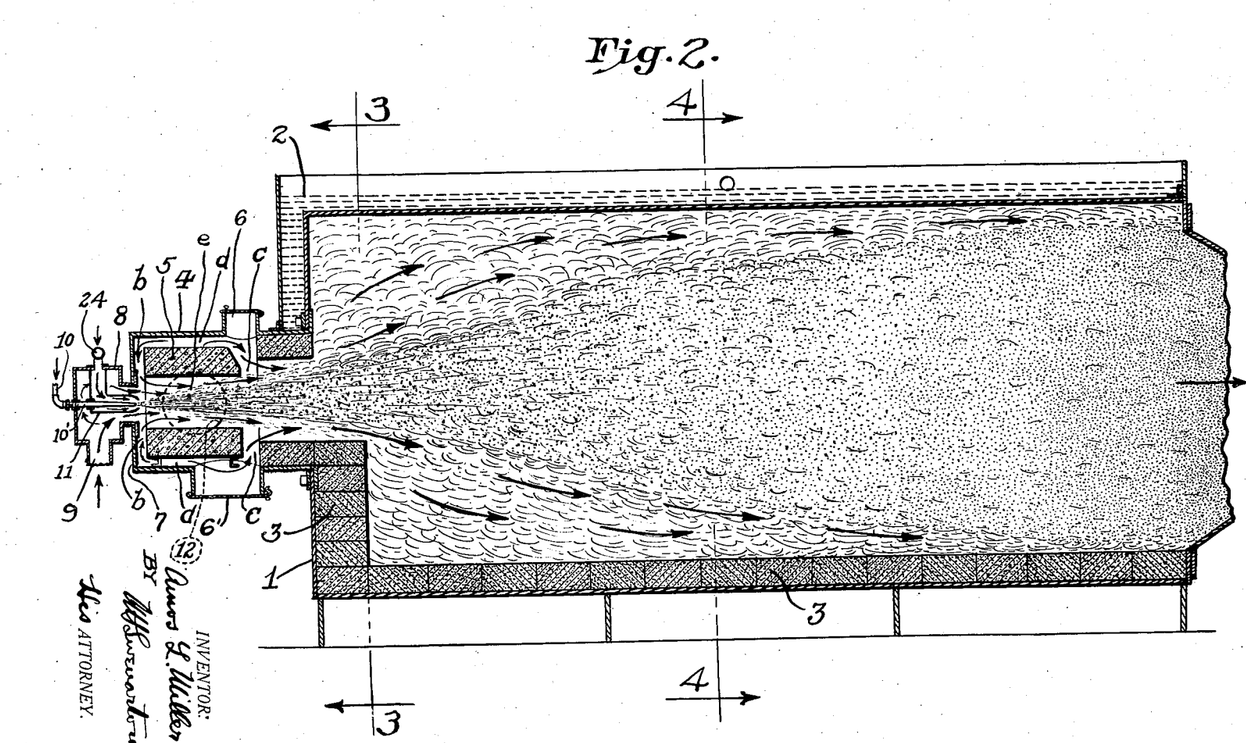
Fig. 2 is a vertical longitudinal section through the furnace unit.
Figure 5:
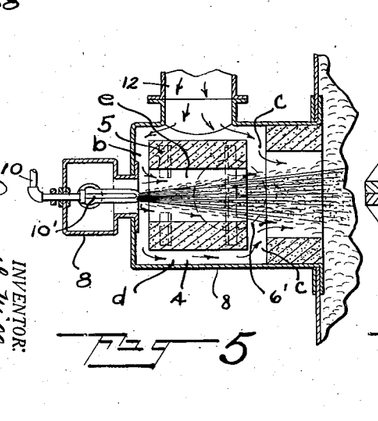
Fig. 5 is a fragmentary horizontal section showing essentially the burner element illustrated in Figs. 2 and 3 which is a type suitable for burning hydrocarbon oils.

In the oil burner construction shown in detail in Figs. 2 and 5, an oil feed pipe 10, which terminates in a nozzle 10', is centrally disposed within the tubular casing or sleeve 11, although obviously any suitable burner of what might be termed the Bunsen type, adapted to admit regulatable quantities of air and hydrocarbon fuel, as petroleum oil for example, are suitable for this purpose. A low pressure pre-heated air supply pipe 12 serves to admit air laterally into the annular chamber c, which latter surrounds the refractory section 5, said pipe 12 being connected by a T 12', section 13 and valve 14 with a T 15 that serves to connect the valve 14 and another T 16 with the preheated air inlet 17. A portion of the preheated air is supplied to the bottom of the burner casing 8 from the inlet 17, through the T 18, section 19, T 20, sections 21 and 21' and the interposed T 22, all of which serve to conduct the preheated air to the port 9.

A steam line 23, provided with a cock 23', serves to admit steam when the same is desired, through a T 24 into the sleeve 11 and the pipe 25, which also is connected to the T 24 and provided with a control cock 26, serve to admit high pressure air to said sleeve 11. A cock 27 admits of the regulated supply of fuel oil or other suitable hydrocarbon oil from an oil supply pipe 28, adapted to be connected to a suitable source of oil supply, to the feed pipe 10 and nozzle 10'.

At the rear end of the furnace is a preheater of the usual type wherein the entering atmospheric air passes through a pipe 29 and is caused to circulate around a series of tubes 30, the internal surfaces of which are in direct contact with and are heated by the hot furnace gases. A suitable blower 31 serves to draw atmospheric air into the preheater and force the same into the preheated air supply pipe 17.

From the preheater the carboniferous furnace gases are conducted through the outlet pipe 32 to branch cooling pipes 33 and 33', which in turn communicate with the front end of a soot collector unit. This unit in the construction shown in Figs. 7 and 8, comprises a cylinder 34 provided with a central longitudinal shaft 35 on which are mounted a plurality of flat discs 36, that are spaced from each other approximately 1" to 1½". Said discs each have a circular series of apertures 37 or 37', the series of apertures in one disc being in staggered relation to the series of the next adjacent disc or discs whereby a tortuous passage of the products of combustion through the collector occurs and a more effective collection or absorption by the oil vehicle with which the discs are drenched is insured.

Figure 7:
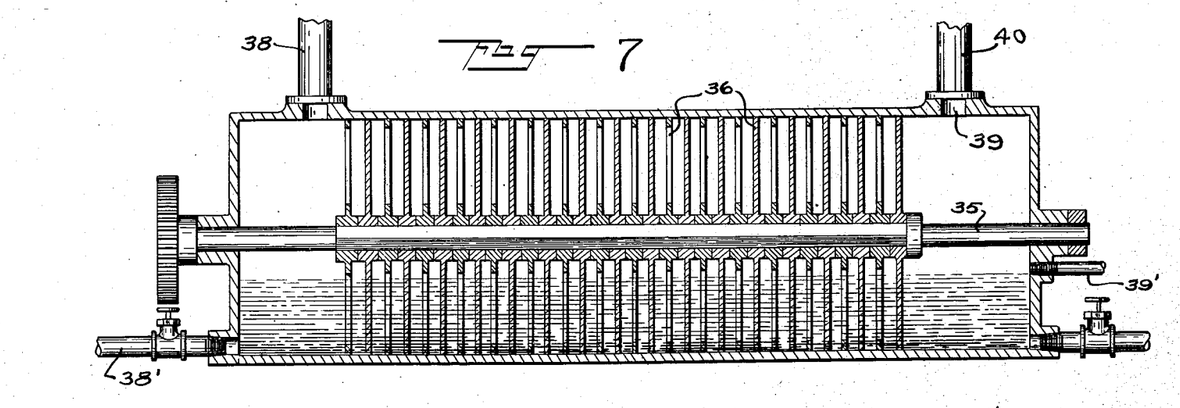
Fig. 7 is a vertical longitudinal section of the collecting unit.
Figure 8:
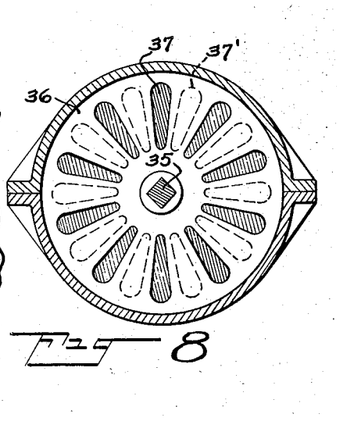
Fig. 8 is a transverse vertical section on the line 8—8 of Fig. 6.

Preferably these apertures are of considerable cros-sectional area, for example, for a series of 32 discs each of about 30" in diameter, I preferably employ 10 apertures each of 20 sq. in. in area each, but in any event, the apertures should be of sufficient size to prevent an injurious back draught or backing up of the gaseous products into the furnace with a consequent retardation of the velocity of the gases issuing from the furnace, as otherwise the proper conditions of operation for the production of soot of the desired quality in the furnace cannot be maintained.

The shaft 35, as shown, is adapted to be rotated by means of suitable gearing in the well known manner and preferably the same is operated at approximately 30 revolutions per minute in a collector where the discs are approximately 30" in diameter and the flow of the gases of combustion entering the collector through the inlet, such as the pipe 38 of 10" diameter is approximately 3,000 ft. per minute. From the collector the gases are caused to pass through an outlet 39 and thence to a suitable stack 40, which latter may, if desired, be provided with suitable high tension dust precipitators or other suitable dust collectors to insure the collection of further quantities of soot from the exit gases.

During the rotation of the discs in the collector, the same, as shown, are alternately submerged in the vehicle of a printing ink, such vehicle, for example, consisting of heavy petroleum oil of a viscosity of 600 (Sayboldt) at 100° F., although the same may comprise any other ink vehicle capable of producing ink of the desired quality by the absorption thereinto or admixture therewith of the carbon black or soot.

The ink vehicle in the collector is maintained in constant circulation, the same entering through the inlet pipe 38' and being drawn through the outlet 39' by means of a rotary pump 41 which discharges into the circular circulation tank 42.

The circulation tank, when operating in an apparatus wherein approximately 50 gal. of fuel are being consumed per hour and wherein the collector is approximately 30" in diameter and 8 ft. long, is preferably of about 10,000 gal. capacity and is originally charged with about 8,000 gals. of oil to allow space for the increase in bulk of the material, as the carbon black or soot is absorbed thereinto. Such tank is unjacketed so as to permit of the same being automatically cooled and maintained at the proper working temperature by the atmospheric air surrounding the same. Suitable heating coils 43 in the bottom of the tank 42 for initially heating the ink vehicle to the necessary working temperature of about 100° F. or at least to a sufficient temperature to prevent the vehicle employed from becoming so viscous that a film will temporarily form across or substantially across the opening in the collector plates as they emerge from the oil vehicle and thereby seriously affect the normal flow and pressure of the gases in the collector.

Figure 3:
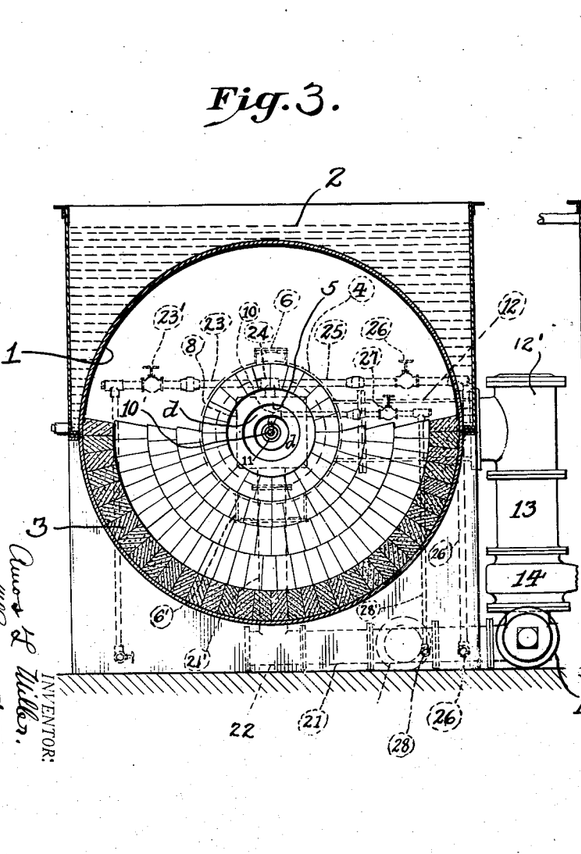
Figs. 3 and 4 are transverse vertical sections taken respectively on the lines 3—3 and 4—4 of Fig. 2.
Figure 4:
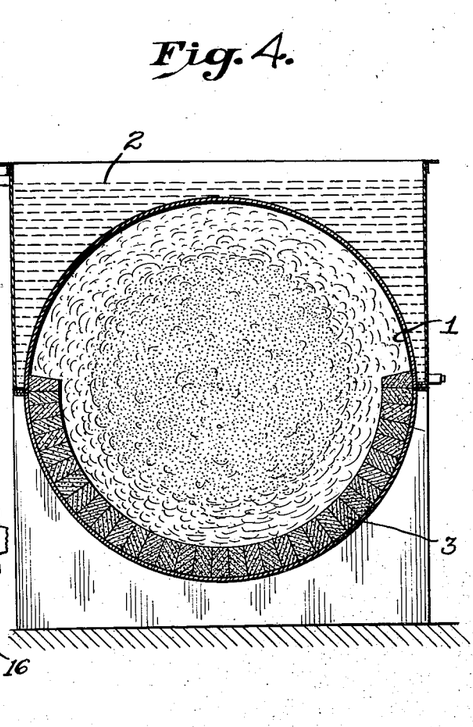
Figure 6:
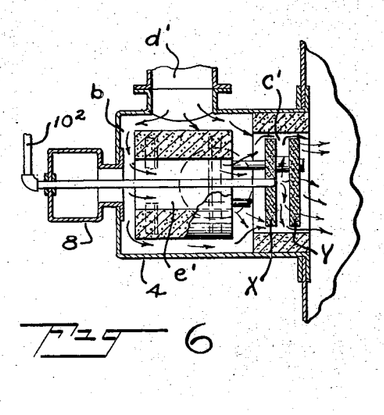
Fig. 6 is a fragmentary vertical section showing a type of burner which it is desirable to employ when burning natural gas or other hydrocarbon gas.

When it is desired to utilize as a fuel a gaseous hydrocarbon, as natural gas for example, it is necessary to employ a different type of burner of the general type illustrated in Fig. 6, wherein a feed pipe $10^2$, having a circular terminal as baffle plate $x$ secured thereto and through which it extends, is employed in lieu of the nozzle illustrated in Figs. 2, 3 and 5. A second baffle plate $y$ is bolted to the first plate in spaced relation therewith so as to provide vertical ducts or passages $c'$ for directing the flow of the gas at substantially right angles to the current of low pressure air entering through the annular duct $d'$. The vertical ducts $b'$ and the central bore $e'$ correspond with the similar duct $b$ and bore $e$ of the oil burner previously described.

Figure 9:
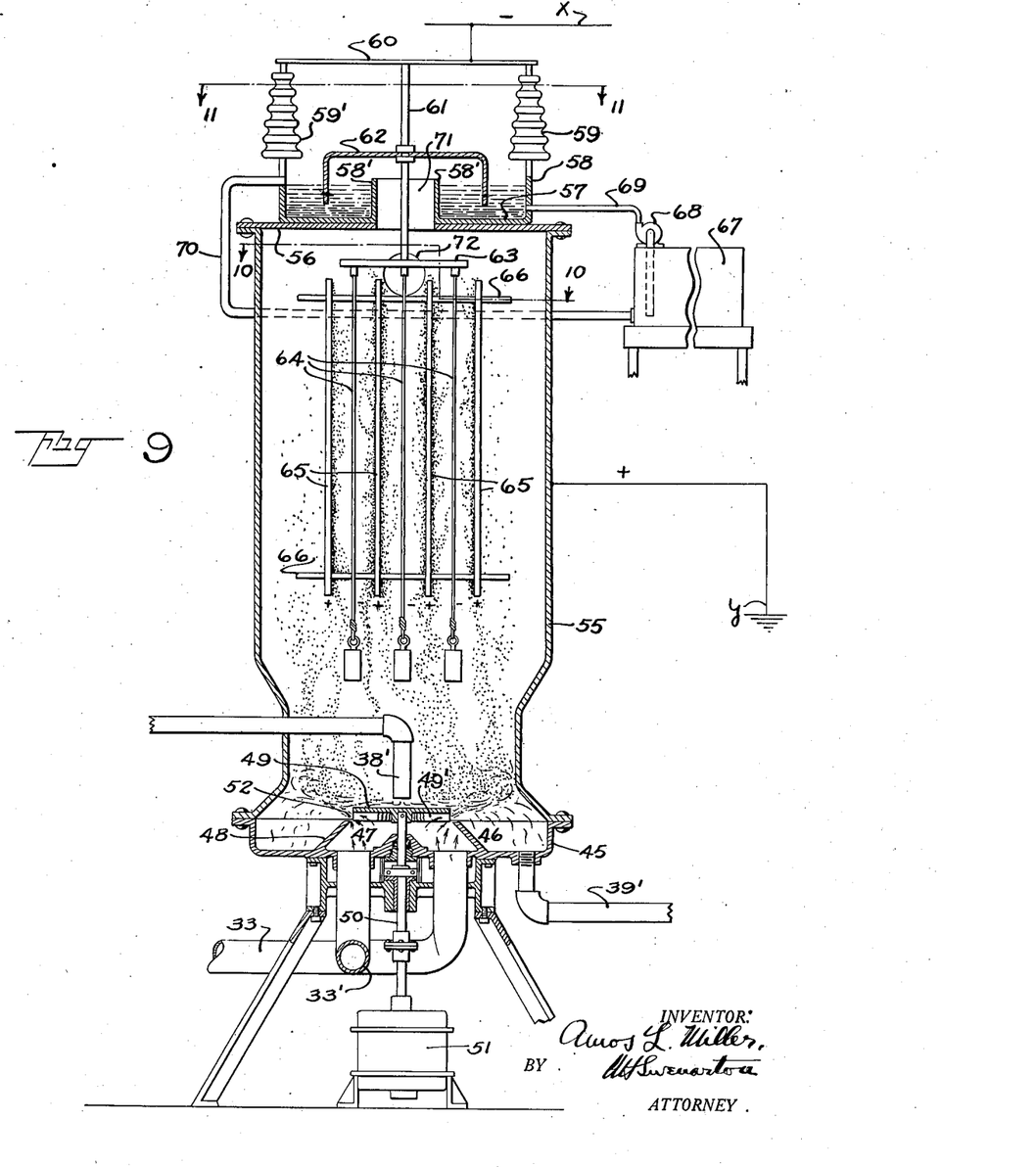
Fig. 9 is a vertical section of an alternate form of collecting unit, isolated.
Figure 10:
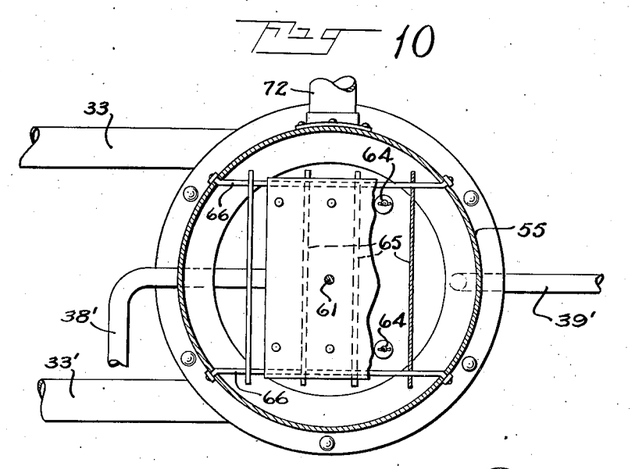
Fig. 10 is a horizontal section on the line 10—10 of Fig. 9.
Figure 11:
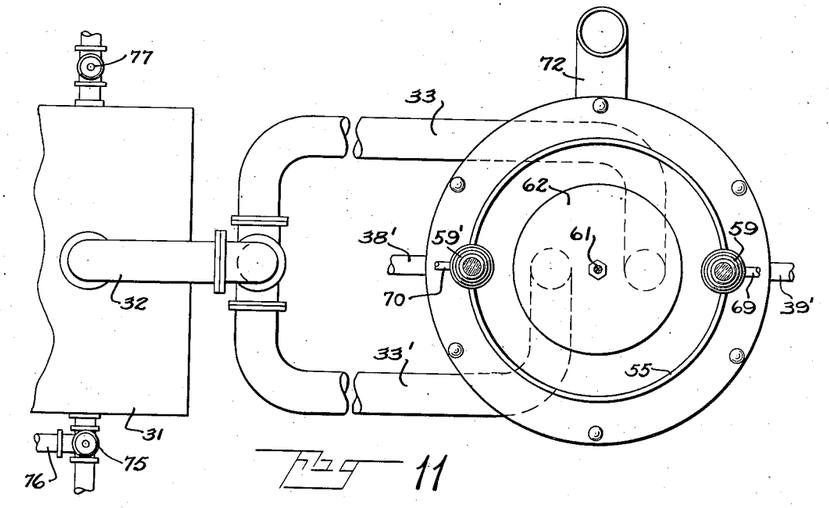
Fig. 11 is a fragmentary plan view showing the collecting unit hooked up in the system.

The alternate form of collector unit shown in Figs 9, 10 and 11 comprises a centrifugal spray scrubber associated with an electric precipitator. Referring to the alternate construction shown in Figs 9, 10 and 11, the reference numeral 45 designates the curb or bowl of a centrifugal spray scrubber which is sub-divided into two compartments 46 and 47 by a cone shaped wall 48. A revolving disc 49, to the underside of which are attached a series of fan blades 49', is mounted on the top of a vertical spindle 50 which is carried in suitable bearing and adapted to be driven at high speeds, for example 1200 R. P. M., by a vertical motor 51. The rotation of said disc 49 uniformly spreads the ink vehicle introduced from the pipe 38' and breaks it up into small drops each of which leaves the disc with a planetary motion and these in turn break up into small drops as the surface tension is reduced. This forms a liquid curtain of uniform density which due to the rotation of the component particles or drops thereof, offers little or no resistance to the passage of gas directed through the annular passage 52 by the action of the fan blades 49'. Said blades also serve to draw the gas into the compartment 47 through the bottom inlets thereof from the branch pipes 33, 33' and to impart the necessary velocity to the soot laden gas to cause the same to impinge as a blast against the liquid curtain thrown off the perimeter of the disc 49.

As a consequence of the foregoing mixing action, the carbon-laden gases will become intimately mixed with the ink vehicle and the greater part, about 95%, of the carbon will become incorporated therewith.

From the chamber or well 47, the carboniferous ink vehicle is discharged through the outlet pipe 39', being withdrawn by the pump 41, in the same manner as when employing the previously described type of collector, and circulated through the tank 42 prior to being returned by means of the pump 44 to the bowl of the collector.

The electrical precipitator which is preferably associated directly with the spray scrubber to form the collecting unit, renders it possible to recover the soot particles not precipitated or absorbed by the scrubber, the same approximating about 5% of the total soot solids produced in the furnace.

The electrical precipitator is supported by the bowl 45 and comprises the tube or cylinder 55 which is flanged at the bottom and top to admit of the same being bolted to a corresponding flange on the bowl 45 and also to receive a centrally apertured cover 56 respectively. An annular receptacle 57, having vertical walls 58, 58', is supported on the cover 56 and the same serves to support the high tension insulators 59, 59' which in turn support the cross-head 60 of copper or like conductive metal. A rod 61, depending from the cross-head, carries a bell 62 and a grid 63 from which latter in turn are suspended weighted cathode wires 64 that project between anode plates 65 carried by and electrically connected with the tube 55 by means of a second grid 66.

The receptacle 57 contains a body of transformer oil or the like which is circulated therethrough from an auxiliary tank 67 by means of a pump 63, supply pipe 69 and outlet pipe 70. The latter pipe is located at a level above the lower edge of the bell 62 so as to effect a liquid seal around the outlet conduit 71 which is in registry with the central aperture of the cover 56. As shown, the conductor 60 is connected to one lead $x$ of a high tension grounded circuit and the tube 55 is grounded as indicated at $y$. The waste gases freed of their soot escape through the outlet 72.

When employing an electrical percipitator, the tube of which is approximately 5 ft. in diameter, for the purpose of precipitating from the waste gases passing through the spray scrubber, the soot particles in the form of sticky, flocculated masses of such specific gravity that they will automatically flake off the collector when the layer of soot thereon extends about 1" in thickness, I have found that a non-arcing or corona discharge which is maintained by a current of 45,000 to 50,000 volts and about 2 amperes is sufficient to accomplish these results when employing anode plates of about 32" in width, $\tfrac{1}{16}$" thickness and 6 ft. long and the cathode wires are spaced therefrom about 4".

The soot particles in the waste gas from the scrubber containing as they do about 20% of oil vehicle and some 10% of water can be recovered from the waste gases to a remarkable extent, and as these sticky oil-laden soot particles detach themselves from the plate, they are not entrained, the velocity employed is say 250' per minute by the current through the gas outlet 72 of the precipitator, but owing to their high specific gravity, they fall in the form of coarse flakes into the circulating oil contained in the chamber 46 and because of the fact that they already have oil incorporated therewith they are readily miscible with and become intimately incorporated in such oil vehicle in such chamber. Otherwise, if the soot particles were dry and did not contain appreciable amounts of oil, the problem of preventing the same escaping from the outlet 72 and removing the same from the plates would be a most serious one.

The aforesaid waste ink ingredients comprising oil-laden soot which are recovered from the mist of oil-soot-laden gases passing into the precipitator from the spray scrubber would be valueless for use as dry lamp black because of the sticky nature thereof due to the presence of oil therein and also due to the extremely small percentage of the same in the gases leaving the scrubbers, some 5%, the monetary value thereof for any purpose is almost negligible. Nevertheless, this oil-laden soot, because of the fact it is in a peculiarly suitable condition for incorporation with the ink vehicle, is a useful ingredient for the ink produced in the manner herein described, but quite aside from its usefulness for this purpose, the elimination of this soot from the waste gases passing through the outlet 72 is of the utmost importance from an operation standpoint, as ink works would ordinarily be installed in relatively congested districts where smoke ordinances usually are in force and consequently it is possible to accomplish the effective removal of the soot from the stack gases.

When it is considered that the concentration of the soot in the gases delivered into the spray scrubber is approximately fifteen times that of the gases obtained from the burning of oil in so-called open air tray burners, difficulties of collecting, as well as the importance of such collector can be more readily appreciated.

The ratio of the air to the hydrocarbon fuel employed is preferably maintained in order to secure the best results approximately constant, as a mere difference of 10% in the amount of air supplied above or below critical or optimum ratio will deleteriously affect the quality of the black obtained. Accordingly, when operating with hydrocarbon oil the proportion of air (preferably preheated) to the oil should be about 7 to 1 by weight, but in no case less than 5 to 1, nor more than 9 to 1. In order to maintain the ratio at or near such optimum, it is not only necessary to directly regulate the rate of air and oil feed, but to indirectly control the rate of air feed through the maintenance of certain optimum conditions in the furnace, in the cooling pipes, in the collector and also when the wet collection is resorted to, in the circulation tank. These optimum conditions require that the velocity of the hot gases in the entrance end of the branch cooling pipes should be maintained at not less than 500 ft. and not above 6,000 ft. per minute in order to insure the requisite collection of the finely divided solid carbon particles by impact of the same against the collection plates and preferably a velocity of 3,000 ft. per minute is employed. At these high velocities the relative difference between the density or specific gravity of the carbon particles to the gaseous medium in which they are suspended will tend to cause the carbon particles to continue in a rectilineal course and impinge against the interposed surfaces of the collector plates instead of being deflected from their path and following the deflected gases through the apertures in such collector plates as would ordinarily be the case were the gases to pass through at a low velocity such as would be the case in a sedimentation collecting chamber. Furthermore, the collector plates, especially in the front end of the collector should be spaced sufficiently far apart to prevent the impacted masses of carbon collected on the plates from choking the circulation of the gases through the collector. Again, the temperature of the furnace should not exceed about 3,000° F. and should be in excess of 2,000° F. The cooling pipes should be of considerable length, for example in an apparatus of the size described herein 8" pipes of a length of 50 ft. each are found desirable in order that the gases will be air cooled in their passage to the collector, since if the gases were cooled by contact with water-jacketed, chilled surfaces, the carbon particles would tend to accumulate in thick layers on the inside of the pipes until the layers were so thick as to serve as effective insulation, whereupon not only would the circulation of the system be affected, but the cooling of the gases in their passage to the collector would be prevented.

In the collector it is important that not only the temperature should be maintained considerably above the condensation point of water, but below the point at which the ink vehicle, when the same is employed in the collector, will substantially volatilize. If dry collection is resorted to, a temperature below that at which the issuing stack gases will spontaneously ignite upon contact with the atmosphere is desirable, not only because of fire risk, but also because of the difficulty of preventing the buckling of the iron or steel plates in the collector if the same are subjected to the action of such hot gases. Accordingly, the temperature of the gases entering the collector is maintained between 250° F. and 1100° F., when operating with an ink vehicle in the collector, and preferably at about 600° F. when an ink vehicle of initial boiling point of 350° F. to 400° F. is employed so as not to heat the same substantially about 270° F. to 300° F. If the temperature of the gases in the dry collector is too hot, there will also be a substantial decrease in the amount of black collected by impact as the tendency for the particles to cling to both the bare metal and to each other is considerably affected by excessive temperatures.

The ink vehicle while initially heated, as herein stated, is prevented from overheating by virtue of the relatively large volume of oil in the circulation tank which results in the exposure of extensive cooling surfaces to the cooling action of the air. In an apparatus of the size herein described, the oil is circulated at about the rate of 1,000 gals. per hour.

Even the speed of rotation of the plates of the collector is an important factor in the production of soot of the desired quality, as if the rate of rotation is too slow, the ink vehicle, when employing set collection, will be incapable of effectively cleansing the plates from their deposits and hence there will be an accumulation of carbon on the plates and a serious choking of the circulation through the system.

When supplying fuel at the rate of about 50 gals. per hour under the above described conditions of operation and while maintaining the relation between the burner 10 and its sleeve so that in no part of the furnace a blue flame is visible, it will be possible to maintain the temperature in the furnace at about 2600° F. and an outer envelope of the gaseous products of combustion of the oil and air will completely surround a central cone comprising the decomposition products of the oil, including a large volume of particles of soot, which cone, commencing at the burner, will be of gradually increasing cross-sectional area.

The longer the soot is heated, the more it becomes roasted and approaches graphite. Therefore, in order to minimize the time of contact of the soot particles with the hot gases in the furnace, it is essential that the velocity of the gases and the rate of feed of the oil be maintained within the above specified limits. If a large quantity of oil, as compared with the air, is fed into the furnace, the air will continue to consume the same for a relatively great distance producing an excessively long flame, whereas if a small quantity of oil relative to the air is employed, a relative short hollow cone of combustion results, or in other words, the smaller the quantity of air, the longer the flame and vice versa. Preferably the amount of oil employed is approximately double that which would be required for complete combustion with the same quantity of air.

In the furnace, the water-jacketed metal top shell serves to eliminate the difficulties that would be experienced with refractory brick arches which rapidly deteriorate under the conditions of operation experienced in such a furnace due to the chilling action and consequent chipping or disintegration of such bricks by the impingement thereon of small masses or drops of unvolatized oil or tar particles. The said water-jacket prevents the excessive heating of the inner surface of the top shell of the furnace owing to the insulating film of carbon which forms on water cooled metal, and consequently substantially no deleterious action such as results from the masses or drops of unvolatilized oil or tar particles from the burner impinging against a brick arch can occur.

The refractory section 5 also has an important function in that it protects the flame directly as it issues from the burner, and until the same has been substantially established, from excessive lateral exposure due to large volumes of air entering through the conduit 12. As a result, a constant current of air is caused to pass through the passages c and strike the flame at some distance from the burner, thus not only affecting the substantial shortening of the incandescent outer envelop of the flame, but increasing the diameter of the inner uncombusted carbon-laden hydrocarbon zone within the furnace whereby the quantity of hydrocarbon which will be destructively decomposed is greatly increased without the combustion thereof, since by the interposition of this cylinder or section the relatively large amount of air introduced for supporting incomplete combustion through the pipe 12, as compared with the amount introduced through the T 24 and the inlet 9, is caused to envelop the inner hydrocarbon cone without becoming intimately and homogeneously mixed therewith.

While preferably the atmospheric air supplied to the burner for effecting the partial combustion of the hydrocarbon is caused to pass through the preheater wherein it is heated to approximately 1,000° F., nevertheless, in the event it is desired to conduct such atmospheric air directly to the burner, this can be accomplished by adjusting a two-way valve 75 so as to short circuit the atmospheric air through the by-pass 76, and then if the cut off valve 77 has been closed none of such air will pass into the preheater.

The collection of the finely divided carbon particles on the collector plates is greatly facilitated by the velocity of the stream of carbon-laden gases which impinges against the same, and the same will rapidly accumulate on the plates, causing a serious choking, as heretofore stated, unless the plates are rotated sufficiently fast to effect the continuous removal of the loosely adherent mass collected by impact on the plates.

Preferably the oil level in the plate collector shown in Fig. 7, is maintained at about 10" and well below the level of the longitudinal axis thereof when employing a collector of a dimension of about 8' long, about 30" wide and having 32 collector plates of the dimensions herein specified as thereby back pressure which occurs when the free space for the passage of the gases through the collector is unduly reduced, can be avoided, provided, of course, the other necessary factors to the successful operation are maintained within the limits herein specified.

Not only is the circulation tank of extremely large size important where air cooling of the ink vehicle returned from the collector is resorted to, but by using large quantities of vehicle the most intimate mixing of the carbon pigment with the ink is possible, so that the necessity for prolonged treatment of the ink in an ink mill is avoided. Furthermore, the direct collection and absorption of the soot in the ink eliminates the necessity for handling, packing and shipping from a distant point of manufacture to the ink works of the bulky dry soot and the attendant expense.

While air or steam may be used, the steam has a cooling effect on the flame and is detrimental to that extent as it produces a lower yield of soot. Ordinarily, therefore, it is only used for cleaning the burner when the apparatus is shut down.

The herein described soot solids differ from the finest grades of lamp black produced from hydrocarbon oil and from carbon produced from hydrocarbon gas in that it has a tinctorial strength intermediate the two and the lamp black has a decidedly bluer tone than my improved soot product, while on the other hand, the carbon black is of a decidedly browner tone than my soot product. Consequently, I have elected to use the term soot to describe my improved product because of the aforesaid characteristics thereof.

While the speed of the gases leaving the furnace should not be below a velocity of 500' per minute and preferably being maintained at about 3,000' per minute, it is essential for the proper precipitation of the oil-laden soot that the velocity of the soot laden gases in the collector should not, in order to prevent the entrainment of the precipitated flakes in the gases through the outlet 72, exceed 500 ft. per minute, being preferably but 250 ft. per minute. This is accomplished without choking the current by virtue of the enlarged cross diameter of the tube 55 about 5 ft., as compared with the combined diameter of the inlet pipes 33, 33'.

When employing the collector shown in Figs. 7 and 8 as a dry collector, it is desirable to have the plates 36 mounted quite loose on the square portion of the shaft 35 in order that the individual vibration of the plates will periodically dislodge the soot when the same has accumulated to a reasonably thick layer thereon. Furthermore, in such an event, the dry soot particles are removed at intervals through a man-hole (not shown).

The preheating of the air to say 1,000° F. increases very materially the yield of soot per gallon besides improving the quality of the soot since it requires that a smaller quantity of oil completely consumed in order to obtain the requisite temperature for effecient operation with the consequence that not only are small quantities of oil and air introduced into the furnace, but a larger percentage of the oil introduced into the furnace decomposed into soot and the soot so obtained because of the smaller quantity of air and oil required when preheating is resorted to is exposed to a smaller flame and hence is roasted or graphitized to a lesser extent than were the air not preheated to a temperature between 500° to 2000° F.

While an excellent quality of soot, which is superior to the best grades of lamp black is obtainable when employing but a single burner, nevertheless, without departing from the spirit of my invention, a plurality of burners each consuming its pro rata supply of oil essential in order to maintain the degree combustion, necessary to meet the requirements of the ink making portions of the aparatus may be employed in a furnace of the size herein described without in any way impairing the quality of the soot obtained.

While I prefer the type of pre-heater disclosed, nevertheless under certain conditions of operation, it may be desirable to utilize the heat which can be obtained by burning the waste gases recovered after the removal of the soot therefrom for the preheating of air, oxygen or like oxidizing medium prior to its being brought into contact within the furnace with the hydrocarbon.

The expression "black pigment consisting of finely divided black carbon" is used in the generic sense to include either lamp black, the product resulting from the decomposition or hydrocarbon oil, or gas black, the product resulting from the decomposition of natural gas, the latter being commonly referred to in the trade as carbon black.

Having thus described my invention, what

I claim and desire to obtain by United States Letters Patent is:—

1. The method of making black pigment consisting of finely divided carbon particles which comprises decomposing a hydrocarbon oil into free carbon and gases at a temperature substantially of between 2,000° F. and 3,000° F. and in an atmosphere wholly incapable of supporting complete combustion, rapidly removing the resultant carbon-laden gases from the zone of combustion at a substantially constant velocity and not less than 500 ft. per minute, then cooling the gases while in transit to temperatures substantially between 300° F. and 1,100° F. while still maintaining the speed of such gases in excess of 500 ft. per minute and effecting the separation of the carbon particles from the products of combustion carrying the same in suspension.

2. The method of making black pigment consisting of finely divided carbon particles which comprises decomposing a hydrocarbon into free carbon and gases at a temperature substantially of between 2,000° F. and 3,000° F. and in an atmosphere wholly incapable of supporting complete combustion, rapidly removing the resultant carbon-laden gases from the zone of combustion at a substantially constant velocity and not less than 500 ft. per minute, then cooling the gases while in transit to temperatures substantially of between 300° F. and 1,100° F. while still maintaining the speed of such gases in excess of 500 ft. per minute, causing said carbon-laden gas to impinge against an interposed film of an oil vehicle extending at an angle to the direction of flow of such gases, continuously withdrawing said vehicle from contact with said gases and causing the same to directly mix with a considerably larger quantity of another portion of the same vehicle while the mixture is being subjected to a cooling action at a point distant from the meeting point of said vehicle with said carbon-laden gases and continuously returning the cooled blended vehicle into contact with further quantities of such cooled carbon laden gases.

3. The method of making black pigment consisting of finely divided carbon particles which comprises decomposing a hydrocarbon into free carbon and gases at a temperature substantially of between 2,000° F. and 3,000° F. and in an atmosphere wholly incapable of supporting complete combustion, rapidly removing the resultant carbon-laden gases from the zone of combustion at a substantially constant velocity and not less than 1,000 ft. per minute nor more than 6,000 ft. per minute, then cooling the gases while in transit to temperatures substantially of between 300° F. and 1,100° F. while still maintaining the speed of such gases in excess of 1,000 ft. per minute, causing said carbon-laden gas to impinge against a sheet of an oily ink vehicle extending at an angle to the direction of flow of such gases maintained in continuous circulation, withdrawing said vehicle from contact with said gas and causing the same to directly mix with a considerably larger quantity of another portion of the same vehicle while the mixture is being subjected to a cooling action at a point distant from the meeting point of said vehicle with said carbon-laden gases and continuously returning the cooled blended vehicle in the form of a sheet into contact with further quantities of such cooled carbon-laden gases.

4. The method of making black pigment consisting of finely divided carbon particles which comprises decomposing a hydrocarbon into free carbon and gases at a temperature substantially of between 2,000° F. and 3,000° F. and in an atmosphere wholly incapable of supporting complete combustion, rapidly removing the resultant carbon-laden gases from the zone of combustion at a substantially constant velocity and not less than 2,000 ft. per minute nor more than 6,000 ft. per minute, gradually cooling, without suddenly chilling, the gases while in transit to temperatures substantially of between 300° F and 1,100° F. while still maintaining the speed of such gases in excess of 2,000 ft. per minute, causing said carbon-laden gas to impinge against an interposed film of an oil vehicle extending at an angle to the direction of flow of such gases maintained in continuous circulation, withdrawing said vehicle from contact with said gases and causing it to directly mix with a considerably larger quantity of another portion of the same vehicle while the mixture is being subjected to a cooling action at a point distant from the meeting point of said vehicle with said carbon-laden gases and continuously returning the cooled blended vehicle into contact with further portions of said cooled carbon-laden gases.

5. The method of making black pigment consisting of finely divided carbon particles which comprises the destructive decomposition into free carbon and gases of a hydrocarbon oil in the presence of between 5 and 9 parts of air by weight to that of the oil, and substantially of between 2,000° F. and 3,000° F. rapidly removing the resultant carbon-laden gases from the zone of combustion at a velocity of not less than 1,000 ft. nor more than 6,000 ft. per minute, gradually cooling said gases while in transit to a temperature below 1,100° F. and in excess of 250° F., causing said cooled gases while still moving at a high velocity and while still heated to a temperature substantially of between 250° F. and 1,100° F. to impinge against a body of oil disposed in the form of a moving film while preventing deleterious back pressure upon the zone of combustion.

6. The method of making black pigment consisting of finely divided carbon particles which comprises the incomplete combustion of hydrocarbon into free carbon and gases at a temperature in excess of 2,000° F. in an atmosphere wholly incapable of supporting complete combustion, rapidly removing the resultant carbon-laden gases from the zone of combustion at a substantially constant velocity and not less than 500 ft. nor more than 6,000 ft. per minute, cooling said gases while in transit to a temperature substantially of between 250° F. and 1100° F., causing said cooled gases while still moving at high velocity and while still heated substantially of between 250° F. and 1100° F. to impinge against a film of a circulating ink vehicle, continuously removing said ink vehicle from contact with the carbon-laden gases and causing the same to mix with several times its volume of the vehicle in another portion of a closed cycle while air-cooling the same and returning the cooled vehicle into contact with further quantities of such carbon-laden gases.

7. In an apparatus for making printing ink, the combination comprising a furnace having a metallic, water-jacketed top for effecting destructive decomposition of a hydrocarbon without the extensive combustion thereof, a liquid scrubber, air-cooled means interposed between the scrubber and the furnace adapted to conduct the decomposition products from said furnace to said scrubber, a circulatory tank of considerably greater capacity than said scrubber in communication therewith, means for maintaining the circulation of said gases through the furnace and the scrubber and separate means for effecting the circulation of the oil vehicle through the scrubber and the circulation tank.

8. In an apparatus of the character described, the combination comprising a furnace, a burner compartment at one end thereof, having an oil burner projecting thereinto for effecting the combustion of a hydrocarbon oil, separate means for supplying air and hydrocarbon oil under pressure to the burner, a hollow baffle of refractory material extending axially of the burner compartment to envelop and protect the flame as it issued from the burner from extensive lateral exposure to air currents, an air conduit adapted to deliver air through the wall of the burner compartment and project the same against the outer longitudinal surface of the baffle, a transverse passage formed intermediate the rear end of the baffle and the front end of the furnace proper arranged to direct air at an angle between 45° and 90° to the axis of the flame against the same as it issues from said baffling envelop, whereby the combustion of the hydrocarbon oil is confined principally to the outer portion of the flame and reduced to a minimum in the central portion thereof and the length of the flame in the furnace considerably shortened, means at the far end of the furnace of considerable extent and surface for conducting the carbon-laden gases from the furnace and effecting the gradual cooling by the atmosphere of said carbon-laden gases, a scrubber in communication with said conducting means, a circulation tank of several times the capacity of said scrubber in communication with the latter and means for circulating oil through such scrubber and thence through said circulation tank and thence back to the collector.

9. In an apparatus for making printing ink, the combination comprising a furnace for effecting destructive decomposition of a hydrocarbon without the extensive combustion thereof, a collector, including an electrical smoke precipitator, air-cooled means interposed between the collector and the furnace adapted to conduct the decomposition products from said furnace to said collector, and a circulatory tank of considerably greater capacity than said collector in communication with said collector, means for maintaining the circulation of said gases through the furnace and the collector and separate means for effecting the circulation of the oil vehicle through the collector and the circulation tank.

10. An apparatus for making carboniferous ink, comprising a furnace for the production of soot by the incomplete combustion of a hydrocarbon, said furnace having an outlet at one end, a scrubber in communication with the said outlet, said scrubber having an inlet in communication with the outlet of said furnace, means for discharging a liquid into intimate contact with the products of combustion delivered into said scrubber and an electrical precipitator associated with said scrubber and adapted to effect the precipitation of impure soot from the gases passing through said scrubber.

11. The method of making black pigment consisting of finely divided carbon particles which comprises decomposing a hydrocarbon into free carbon and gases at a temperature substantially of between 2,000° F. and 3,000° F. and in an atmosphere wholly incapable of supporting complete combustion, rapidly removing the resultant carbon-laden gases from the zone of combustion at a substantially constant velocity and not less than 500 ft. per minute, gradually cooling, without suddenly chilling, the gases while in transit to temperatures substantially between 300° F. and 1,100° F. while still maintaining the speed of such gases in excess of 500 ft. per minute, effecting the separation of the carbon particles from the products of combustion carrying the same in suspension and then effecting the electrical precipitation of the soot particles from the gases by means of a silent electric discharge while the same are travelling at a greatly reduced velocity as compared with the velocity of the gases issuing from the furnace but without causing a deleterious back pressure upon the gases in the furnace.

12. The method of making carboniferous ink which consists in effecting the incomplete combustion of a hydrocarbon, cooling the products of combustion, effecting the intimate mixing of the products of combustion with a film of oil while the same are travelling at high speed and effecting the precipitation of oil-laden soot flakes from the unabsorbed products of combustion by causing the same to pass through an electrical field produced by a non-disruptive corona discharge.

13. The sub-process which consists in effecting the intimate mixture of the hot decomposition products resulting from the incomplete combustion of a hydrocarbon with an oily vehicle in the form of a film composed of minutely sub-divided oil particles and then subjecting the oil and soot-laden gases not absorbed by such vehicle to the action of an electric field produced by a high tension non-disruptive corona discharge to precipitate sticky oil-laden soot flakes therefrom.

14. The sub-process which consists in effecting the intimate mixture of the hot decomposition products resulting from the incomplete combustion of a hydrocarbon with an oily vehicle in the form of a film composed of minutely sub-divided oil particles and then subjecting the oil and soot-laden gases not absorbed by such vehicle to the action of an electric field produced by a high tension non-disruptive corona discharge to precipitate sticky oil-laden soot flakes therefrom, causing the resulting soot vehicle to mix with an extremely large body of a similar vehicle in order to effectively mix and cool the soot and oil mixture and repeatedly returning the cooled mixture into contact with further quantities of soot-laden gases produced by such combustion.

15. The method of making black pigment consisting of finely divided carbon which comprises the incomplete decomposition of a hydrocarbon oil by means of an oxidizing medium preheated to a temperature substantially of between 500° F. and 2000° F. such decomposition being effected at a temperature in excess of 2000° F., rapidly removing the resultant carbon-laden gases from the zone of combustion at a substantially constant velocity and not less than 500 ft. per minute, then cooling the gases while in transit to temperatures substantially of between 300° F. and 1100° F. while still maintaining the speed of such gases in excess of 500 ft. per minute and effecting the separation of the carbon particles from the products of combustion carrying the same in suspension.

16. The method of making black pigment consisting of finely divided carbon which comprises the incomplete decomposition of a hydrocarbon oil by means of an oxidizing medium preheated to a temperature substantially of between 800° F. and 1200° F., such decomposition being effected at a temperature in excess of 2000° F., rapidly removing the resultant carbon-laden gases from the zone of combustion at a substantially constant velocity and not less than 500 ft. per minute, then cooling the gases while in transit to temperatures substantially of between 300° F. and 1100° F. while still maintaining the speed of such gases in excess of 500 ft. per minute and effecting the separation of the carbon particles from the products of combustion carrying the same in suspension.

17. The method which comprises decomposing a hydro-carbon oil into free carbon and gases at a temperature substantially of between 2000° F. and 3000° F. and in an atmosphere wholly incapable of supporting complete combustion, rapidly removing the resultant carbon-laden gases from the zone of combustion at a substantially constant velocity and not less than 500 ft. per minute, then cooling the gases while in transit to temperatures substantially between 300° F. and 1100° F. while still maintaining the speed of such gases in excess of 500 ft. per minute and effecting the separation of the carbon particles from the products of combustion carrying the same in suspension, including the electrical precipitation of at least a portion of such carbon particles from the products of combustion carrying the same in suspension while such products of combustion are travelling at a greatly reduced velocity as compared with the velocity of the gases issuing from the furnace and without causing deleterious back pressure from the gases in the furnace.

Signed at New York city, in the county of New York and State of New York, this 26th day of February, 1927.

AMOS L. MILLER.